US009934395B2

(12) United States Patent
Paulovicks et al.

(10) Patent No.: US 9,934,395 B2
(45) Date of Patent: Apr. 3, 2018

(54) ENABLING SECURE BIG DATA ANALYTICS IN THE CLOUD

(71) Applicant: INTERNATIONAL BUSINESS MACHINES CORPORATION, Armonk, NY (US)

(72) Inventors: Brent Paulovicks, Danbury, CT (US); Vadim Sheinin, Yorktown Heights, NY (US); Petros Zerfos, New York, NY (US)

(73) Assignee: International Business Machines Corporation, Armonk, NY (US)

(*) Notice: Subject to any disclaimer, the term of this patent is extended or adjusted under 35 U.S.C. 154(b) by 122 days.

(21) Appl. No.: 14/852,170

(22) Filed: Sep. 11, 2015

(65) Prior Publication Data
US 2017/0076105 A1 Mar. 16, 2017

(51) Int. Cl.
G06F 21/62 (2013.01)
H04L 29/08 (2006.01)
G06F 17/30 (2006.01)
H04L 29/06 (2006.01)

(52) U.S. Cl.
CPC .... *G06F 21/6218* (2013.01); *G06F 17/30067* (2013.01); *H04L 63/00* (2013.01); *H04L 67/1097* (2013.01)

(58) Field of Classification Search
CPC ........... G06F 21/6218; G06F 17/30067; H04L 67/1097; H04L 63/00
See application file for complete search history.

(56) References Cited

U.S. PATENT DOCUMENTS 7,783,615 B1 * 8/2010 Compton .......... G06F 17/30082
707/636
8,117,464 B1 * 2/2012 Kogelnik ............ H04L 63/0428
380/284
9,563,681 B1 * 2/2017 Patiejunas ......... G06F 17/30575
(Continued)

OTHER PUBLICATIONS

Yang, et al., "Research on Cloud-Based Mass Log Data Management Mechanism", Journal of Computers, Jun. 2014, pp. 1371-1377, vol. 9, No. 6.
(Continued)

*Primary Examiner* — Hosuk Song
*Assistant Examiner* — J. Brant Murphy
(74) *Attorney, Agent, or Firm* — Tutunjian & Bitetto, P.C.; Jennifer Davis

(57) ABSTRACT

Methods are provided for enabling secure big data analytics in the cloud. A method includes reading a secure file, by a Secure Distributed File System in a public cloud service provider. The reading step includes computing a hash of a name of the secure file to obtain a hashed file name, finding metadata for the secure file using the hashed file name, retrieving a sharing policy identifier from the metadata, and obtaining authorization from an external entity to decrypt the secure file. The reading step further includes extracting a security key and encrypted data file names from the metadata using the sharing policy identifier, requesting one or more encrypted data files that form the secure file from a node of the public cloud service provider, and at least one of decrypting and reconstructing plaintext data for the secure file from the one or more encrypted data files.

20 Claims, 7 Drawing Sheets

(56) References Cited

U.S. PATENT DOCUMENTS

| | | | | |
|---|---|---|---|---|
| 2003/0196114 A1* | 10/2003 | Brew | .................. | G06F 21/10 |
| | | | | 726/1 |
| 2012/0110328 A1* | 5/2012 | Pate | .................. | G06F 21/6218 |
| | | | | 713/165 |
| 2012/0297188 A1* | 11/2012 | van der Linden | .... | G06F 21/602 |
| | | | | 713/165 |
| 2013/0117847 A1 | 5/2013 | Friedman et al. | | |
| 2013/0318269 A1 | 11/2013 | Dalal et al. | | |
| 2014/0006338 A1 | 1/2014 | Watson et al. | | |
| 2014/0013112 A1* | 1/2014 | Cidon | .................. | G06F 21/6218 |
| | | | | 713/165 |
| 2014/0019498 A1* | 1/2014 | Cidon | .................. | G06F 17/3007 |
| | | | | 707/827 |
| 2014/0075184 A1* | 3/2014 | Gorbach | .................. | H04L 63/06 |
| | | | | 713/155 |
| 2014/0189348 A1* | 7/2014 | El-Shimi | ............. | G06F 21/6218 |
| | | | | 713/165 |
| 2014/0230006 A1* | 8/2014 | Burke | .................. | H04L 63/20 |
| | | | | 726/1 |
| 2015/0288664 A1* | 10/2015 | Murray | ............... | H04L 63/0435 |
| | | | | 713/165 |
| 2015/0365385 A1* | 12/2015 | Hore | .................. | H04L 63/06 |
| | | | | 713/152 |
| 2016/0078245 A1* | 3/2016 | Amarendran | ....... | G06F 21/6218 |
| | | | | 713/193 |
| 2017/0039080 A1* | 2/2017 | Chadha | ............... | G06F 9/45558 |

OTHER PUBLICATIONS

2014 Services/BigData Congress CLOUD/ICWS/SCC/MS, Jul. 2014, 68 Pages.

IBM, et al., "A Secure Method to Protect Confidential Data by Storing and Retrieving Files in Pieces in Cloud Computing" An IP.com Prior Art Database Technical Disclosure, Mar. 2009, 14 Pages.

Anonymous, "Greener Method for Sensitive Data Allocation Across Storage Cloud", An IP.com Prior Art Database Technical Disclosure, Aug. 2011, 6 Pages.

\* cited by examiner

ENABLING SECURE BIG DATA ANALYTICS IN THE CLOUD

BACKGROUND

Technical Field

The present invention relates generally to cloud computing and, in particular, to enabling secure Big Data analytics in the cloud.

Description of the Related Art

One of the main challenges for providing Big Data Analytics-as-a-Service in the public Cloud is security of the enterprise data that is transferred and stored in the public cloud storage facilities and used for further analytics processing using Big Data platforms such as Hadoop®. This is due to the fact that while the enterprise data storage environment can be trusted for storing sensitive enterprise data, once this data is transferred to the cloud it is exposed to the system administrators of the public cloud service provider that can access the data at any time. While the data can be secured before being uploaded to the public cloud, this complicates further analytics processing that the data might undergo in the cloud using Analytics-as-as-Service since analytics algorithms running on the Hadoop® platform cannot process encrypted/secured data. We note that such Analytics-as-a-Service can involve the deployment and provisioning of analytics processing platforms such as Hadoop® on physical/virtual machines in the cloud.

Current solutions to this problem either: (approach a) assume that the enterprise fully trusts the public cloud service provider to not access its data once the data is uploaded there in clear text, which might not be acceptable if the data is sensitive (e.g., due to regulatory and/or legal reasons and/or so forth); or (approach b) attempt to fully encrypt the underlying file system of the physical/virtual machines onto which the Big Data platform is deployed. The latter approach (approach b) has certain drawbacks, including: (1) inflexible separation between secured and unsecured enterprise data that might be needed for analytics processing, which lacks fine-grained control over which files are secured and which are not secured; (2) requiring configuration changes of the underlying operating system onto which the Big Data analytics platform is deployed, which might create additional administrative and management costs for the public cloud service provider; and (3) not allowing for fine-grain control over the security algorithms and parameters used on a per data file basis. The former approach (approach a) has certain drawbacks, including: (1) non-compliance with regulatory requirements (e.g., Federal Financial Institutions Examination Council (FFIEC), Health Insurance Portability and Accountability Act (HIPPA), etc.) that might dictate that certain data of sensitive nature (e.g., financial records, health records, etc.) cannot be stored in clear-text in public service cloud providers; (2) public cloud service providers may have to respond to government subpoenas and other legal actions that could force them to hand over data to authorities that the original owner of the data might not want to reveal (e.g., a company based out of one jurisdiction such as Germany might not want to hand over sensitive data to the U.S. entities if the cloud service provider is based out of the U.S.); (3) it is not always possible to guarantee safeguards on data that resides with public cloud service providers, in order to consequently trust that the enterprise data will be handled with all appropriate care and procedures that the enterprise itself follows.

Thus, there is a need for enabling Hadoop®-based (or other bulk synchronous processing system-based) Big Data analytics in the cloud without trusting the data storage facilities of the public cloud service provider (i.e., provide data-at-rest security).

SUMMARY

According to an aspect of the present principles, a method is provided. The method includes reading a secure file, by a Secure Distributed File System in a public cloud service provider having a processor and a memory device. The reading step includes computing a hash of a name of the secure file to obtain a hashed file name. The reading step further includes finding metadata for the secure file using the hashed file name. The reading step also includes retrieving a sharing policy identifier from the metadata. The reading step additionally includes obtaining authorization from an external entity to decrypt the secure file. The reading step further includes extracting a security key and encrypted data file names from the metadata using the sharing policy identifier. The reading step also includes requesting one or more encrypted data files that form the secure file from a node of the public cloud service provider. The reading step additionally includes at least one of decrypting and reconstructing plaintext data for the secure file from the one or more encrypted data files.

According to another aspect of the present principles, a method is provided. The method includes creating, by a MapReduce application, a secure file configured for storage in a Secure Distributed File System in a public cloud service provider having a processor and a memory device. The creating step includes determining a sharing policy identifier for the secure file. The creating step further includes obtaining a security key and security parameters for the secure file from an external entity. The creating step also includes writing one or more encrypted data files for the secure file. The creating step additionally includes computing a hash of a name of the secure file. The creating step further includes determining a method for storing metadata for the secure file. The creating step also includes storing the encrypted data files and the metadata for the secure file.

According to yet another aspect of the present principles, a method is provided. The method includes determining, by a Secure Distributed File System in a public cloud service provider having a processor and a memory device, a security key for a file with an obfuscated file name. The determining step includes determining a storage method used to storing metadata for the file with the obfuscated file name. The determining step further includes obtaining the metadata responsive to the storage method. The determining step also includes extracting a sharing policy identifier from the metadata. The determining step additionally includes forwarding the sharing policy identifier to an external entity to request a security key for the file with the obfuscated file name. The determining step further includes receiving the security key from the external entity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to enabling secure Big Data analytics in the cloud. In an embodiment, the present principles relate to secure Hadoop® as a cloud service.

In an embodiment, the present principles introduce SDFS (Secure Distributed File System). In an embodiment, the SDFS is implemented as a new software module/layer that sits on top of the stackable file system of Hadoop®. In an embodiment, the SDFS is implemented with a processor and a memory. In an embodiment, SDFS is responsible for performing security functionalities (encryption/decryption, signing/integrity check, and so forth) on data files that are requested by MapReduce jobs deployed in a Hadoop® cluster in the public cloud service provider. The MapReduce jobs (which include the analytics algorithms and are developed by the enterprise) request secure data files from the SDFS file system layer, which obtains the right security keys and parameters for the security functionalities of the secure data files. In an embodiment, the SDFS file system layer is identified by the prefix: sdfs:// in the Uniform Resource Locator (URL) of the file.

Thus, SDFS encrypts/decrypts and deconstructs/reconstructs data files written/retrieved through the Hadoop® Distributed File System. In an embodiment, SDFS keeps security metadata on files synchronized with the enterprise data storage. In an embodiment, SDFS identifies and retrieves keys used to encrypt each file according to the sharing policies specified for each file. In an embodiment, SDFS maintains security and high-availability through secret sharing information dispersal algorithms.

While one or more embodiments of the present principles are described with respect to Hadoop® and/or a Hadoop® system, the present principles are not limited to the same, and can be applied to any bulk synchronous processing system as readily appreciated by one of ordinary skill in the art given the teachings of the present principles provided herein. Other examples of bulk synchronous processing systems include, but are not limited to, Apache Hama for massive scientific computations and Apache Giraph for graph processing.

Figure 1:
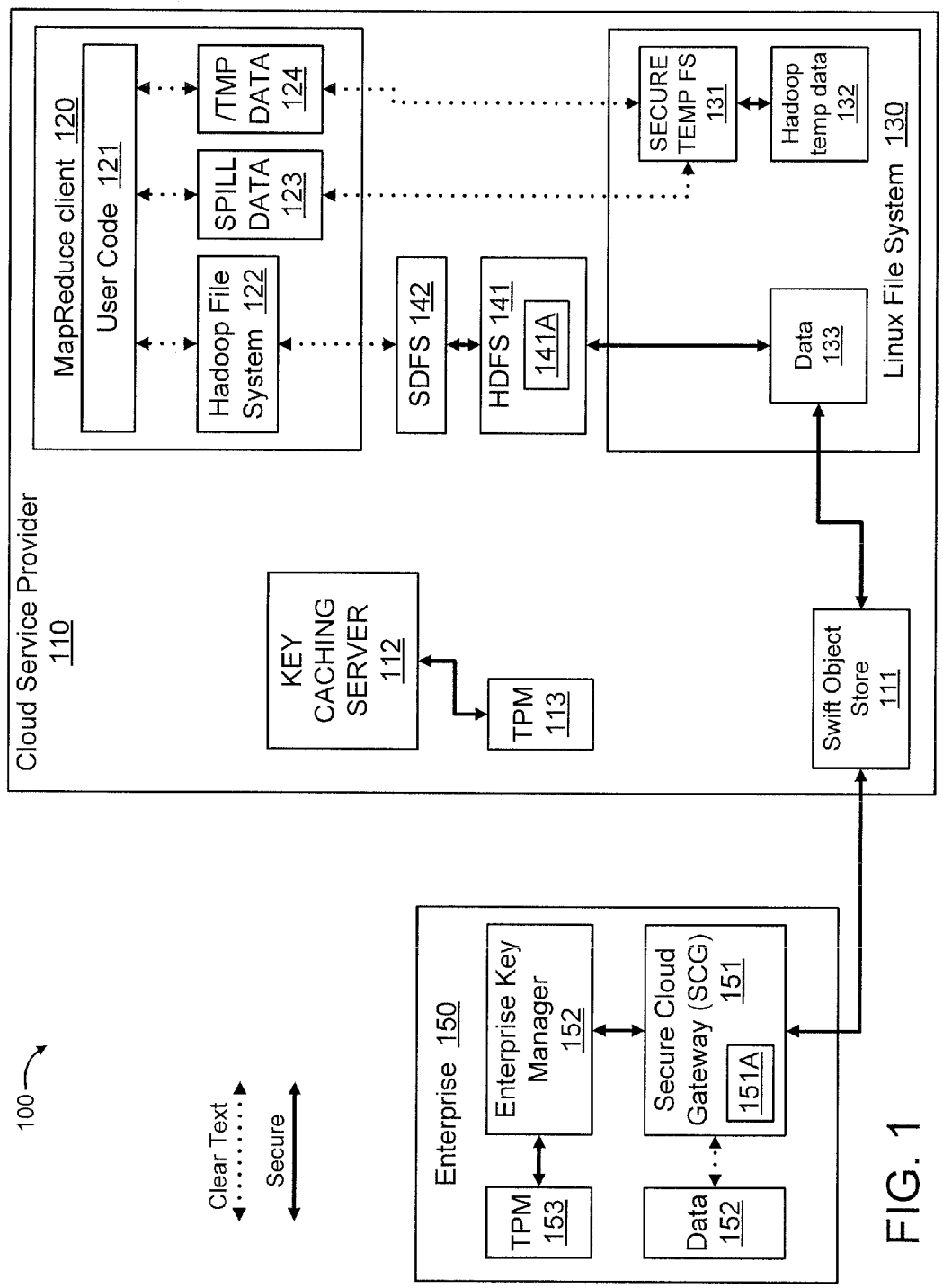
FIG. 1 shows an exemplary system 100 for enabling secure Big Data analytics in the cloud, in accordance with an embodiment of the present principles.

FIG. 1 shows an exemplary system 100 for enabling secure Big Data analytics in the cloud, in accordance with an embodiment of the present principles.

The system 100 involves a cloud service provider 110 and an enterprise client 150.

The cloud service provider 110 includes a MapReduce client 120 (also interchangeably referred to herein as a MapReduce application). The MapReduce client 120 includes user code 121, accesses the Hadoop® file system 122, and generates spill data 123 during intermediate MapReduce computations, and also generates temporary data (hereinafter also interchangeably referred to as "/tmp data") 124.

The cloud service provider 110 also includes a Linux file system 130. The Linux file system 130 includes a secure temp file system (FS) 131, Hadoop® temp data storage device 132, and a data storage device 133.

The cloud service provider 110 further includes a Hadoop® node 140. The Hadoop® node 140 includes a Hadoop® Distributed File System (HDFS®) 141 and a Secure Distributed File System (SDFS) 142. The HDFS® 141 includes a namenode placement module 141A.

The cloud service provider 110 additionally includes a swift object store 111, a key caching server 112, and a TPM (Trusted Platform Module) 113.

The enterprise client 150 includes a Secure Cloud Gateway (SCG) 151, an enterprise key manager 152, a TPM 153, and data 154. The SCG 151 includes a re-keying device 151A.

A description will now be given of the file format for the SDFS 242, in accordance with an embodiment of the present principles.

In order to be used in the SDFS 142, an encrypted file includes two main parts: (1) a metadata part; and (2) a data file(s) with the actual encrypted data. The metadata part includes two sections: (1) a plain-text metadata section with the share-policy-name and (optional) authentication code for metadata section; and (2) an encrypted metadata section. The encrypted metadata section describes the following: the encryption method for file; parameters; a list of names of (encrypted) data files; and an optional authentication code.

Figure 2:
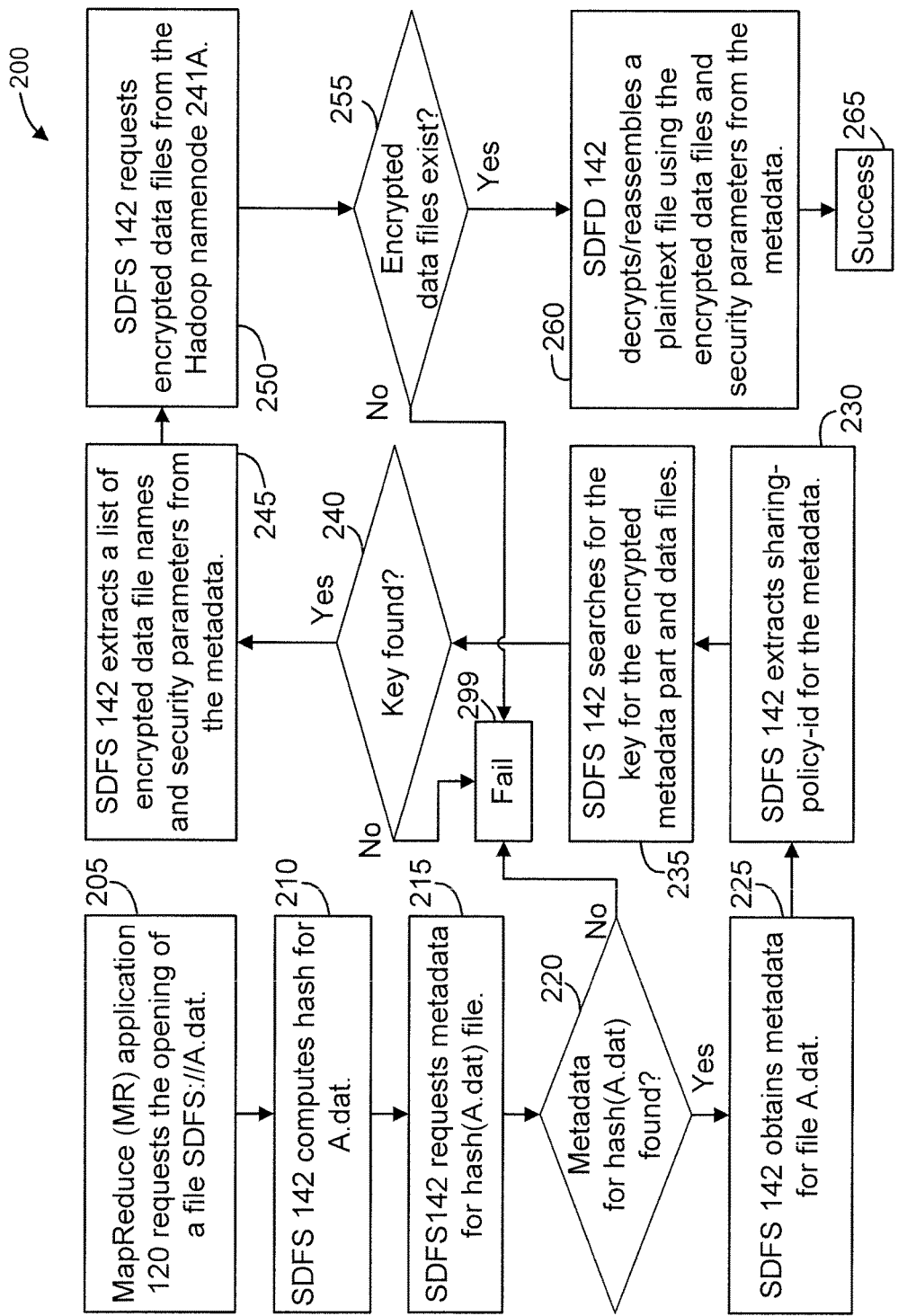
FIG. 2 shows an exemplary method 200 for opening a file, in accordance with an embodiment of the present principles.

The metadata part can be any of: (1) stored as a separate file in the Cloud Object Store (e.g., for file "A.dat", metadata file can be named "A.dat.metadata"); (2) stored as extra parameters of the key-value pair that corresponds to the encrypted data file in the Cloud Object Store; and (3) appended at end of the (encrypted) data file FIG. 2 shows an exemplary method 200 for opening a file, in accordance with an embodiment of the present principles. The method 200 is performed by the SDFS 142.

At step 205, the MapReduce (MR) application (app) 120 requests the opening of a file SDFS://A.dat.

At step 210, the SDFS 142 computes hash for A.dat.

At step 215, the SDFS 142 requests metadata for hash (A.dat) file.

At step 220, determine whether the metadata for hash (A.dat) has been found. If so, the method proceed to step 225. Otherwise, the method proceeds to step 299.

At step 225, the SDFS 142 obtains metadata for file A.dat.

At step 230, the SDFS 142 extracts sharing-policy-id for the metadata.

At step 235, the SDFS 142 searches for the key for the encrypted metadata part and data files.

At step 240, determine if the key has been found. If so, the method proceeds to step 245. Otherwise, the method proceeds to step 299.

At step 245, the SDFS 142 extracts a list of encrypted data file names and security parameters from the metadata.

At step 250, the SDFS 142 requests encrypted data files from the Hadoop® namenode 241A.

At step 255, determine if the encrypted data files exist. If so, the method proceeds to step 260. Otherwise, the method proceeds to step 299.

At step 260, the SDFD 142 decrypts/reassembles a plaintext file using the encrypted data files and security parameters from the metadata.

Step 265 indicates/represents a successful completion of the method.

Step 299 indicates/represents a failure of the method.

Figure 3:
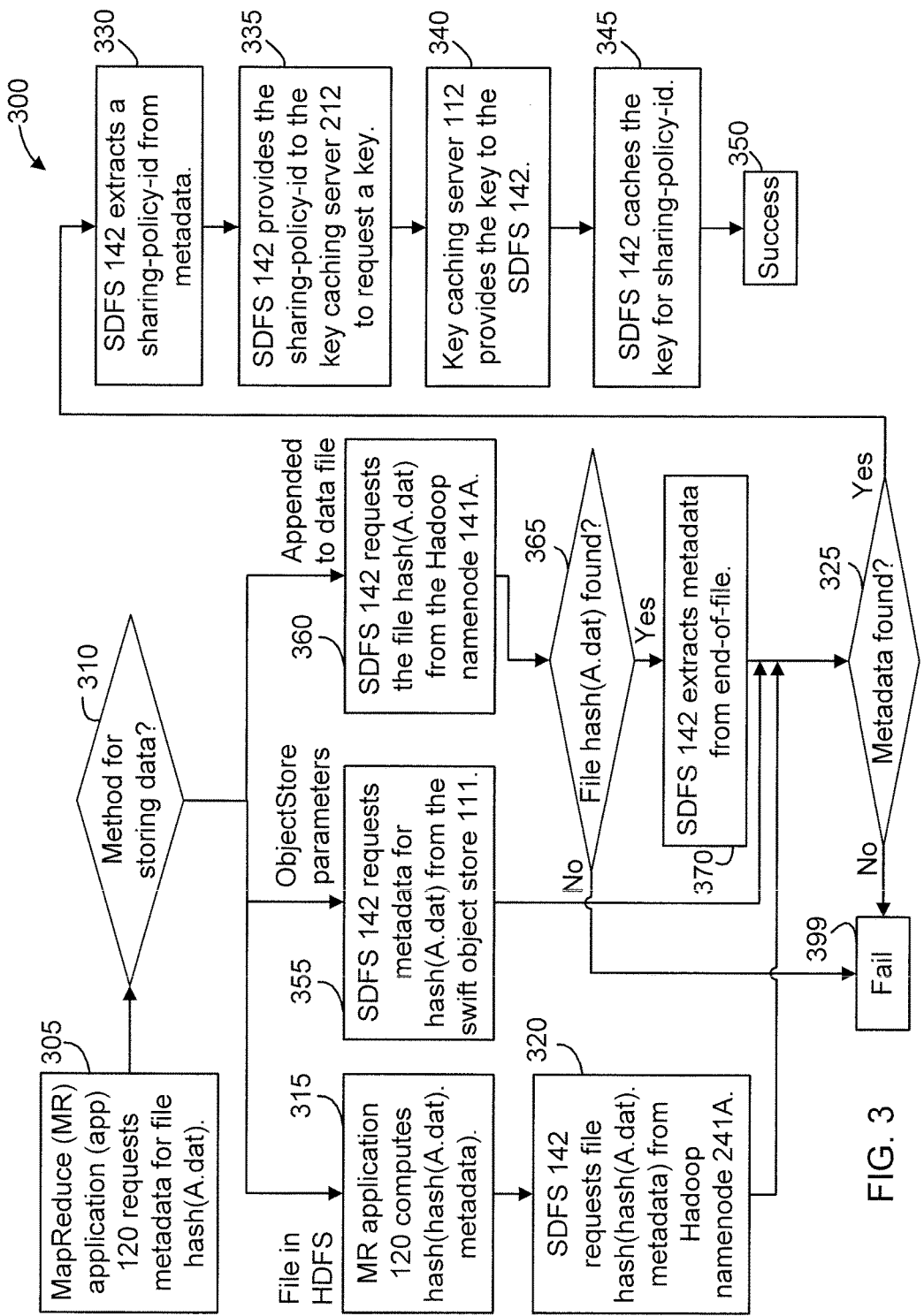
FIG. 3 shows an exemplary method 300 for finding a security key for a file with an obfuscated file name, in accordance with an embodiment of the present principles.

FIG. 3 shows an exemplary method 300 for finding a security key for a file with an obfuscated file name, in accordance with an embodiment of the present principles. The method 300 is performed by the SDFS 142.

At step 305, the MapReduce (MR) application (app) 120 requests metadata for file hash(A.dat).

At step 310, determine the method used for storing metadata. If the method is to store the metadata in the HDFS® 141, then the method 300 proceeds to step 315. If the method is to store the metadata as ObjectStore parameters, then the method 300 proceeds to step 355. If the method is to store the metadata appended to the data file, then the method 300 proceeds to step 360.

At step 315, the MR application 120 computes hash(hash (A.dat).metadata).

At step 320, the SDFS 142 requests file hash(hash(A.dat) .metadata) from Hadoop® namenode 241A.

At step 325, determine whether the metadata has been found. If so, the method proceeds to step 330. Otherwise, the method proceeds to step 399.

At step 330, the SDFS 142 extracts a sharing-policy-id from metadata.

At step 335, the SDFS 142 provides the sharing-policy-id to the key caching server 212 to request a key.

At step 340, the key caching server 112 provides the key to the SDFS 142.

At step 345, the SDFS 142 caches the key for sharing-policy-id.

Step 350 indicates/represents a successful completion of the method.

At step 355, the SDFS 142 requests metadata for hash (A.dat) from the swift object store 111.

At step 360, the SDFS 142 requests the file hash(A.dat) from the Hadoop® namenode 141A.

At step 365, determine whether file hash(A.dat) has been found. If so, then the method proceeds to step 370. Otherwise, the method proceeds to step 399.

At step 370, the SDFS 142 extracts metadata from end-of-file.

Step 399 indicates/represents a failure of the method.

Figure 4:
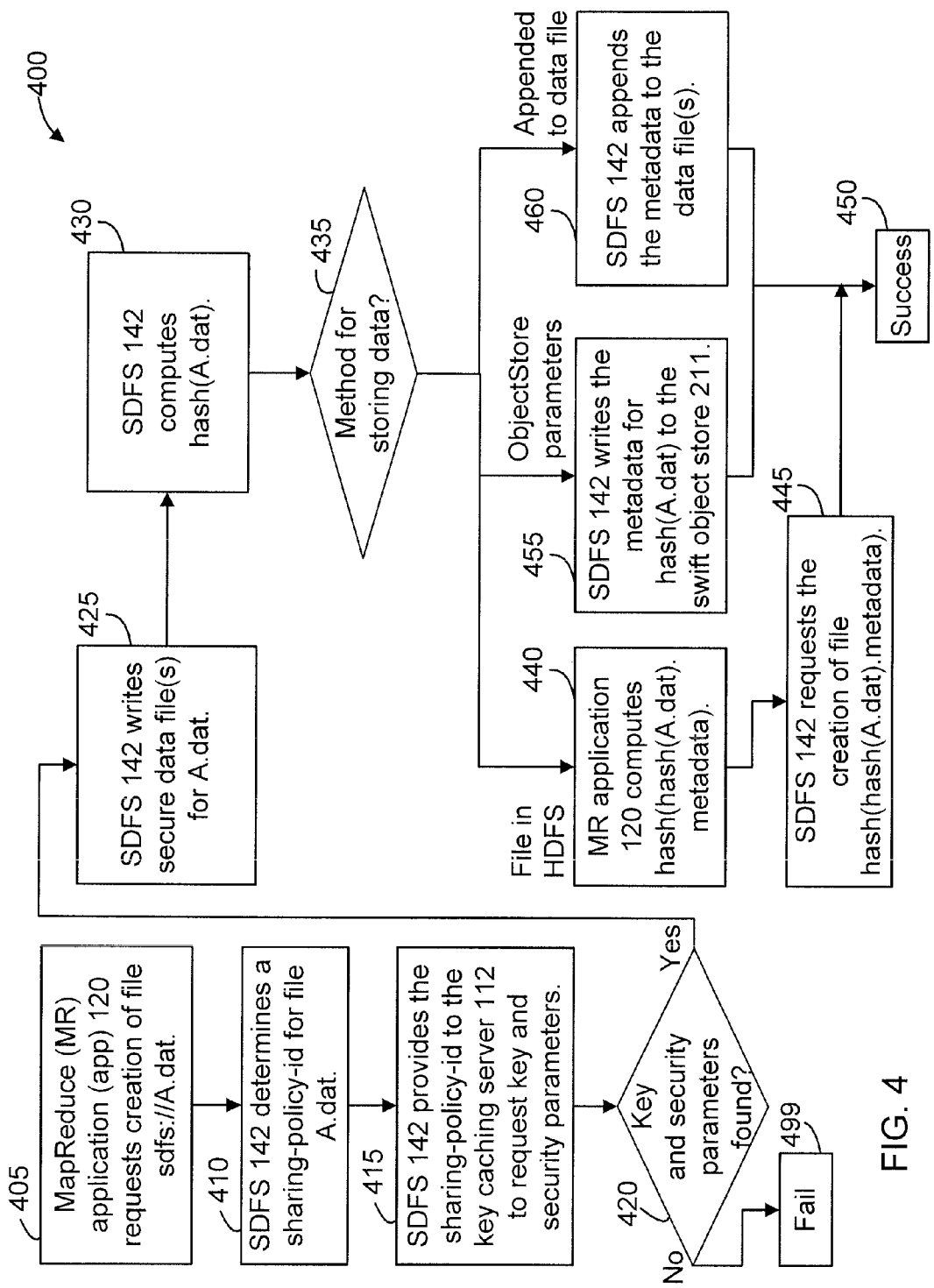
FIG. 4 shows an exemplary method 400 for creating a secured file in a Secure Distributed File System, in accordance with an embodiment of the present principles.

FIG. 4 shows an exemplary method 400 for creating a secured file in a Secure Distributed File System, in accordance with an embodiment of the present principles. The method 400 is performed by the MapReduce application 120.

At step 405, the MapReduce (MR) application (app) 120 requests creation of file sdfs://A.dat.

At step 410, the SDFS 142 determines a sharing-policy-id for file A.dat.

At step 415, the SDFS 142 provides the sharing-policy-id to the key caching server 112 to request key and security parameters.

At step 420, determine whether the key and security parameters have been found. If so, then the method proceeds to step 425. Otherwise, the method proceeds to step 499.

At step 425, the SDFS 142 writes a secure data file(s) for A.dat.

At step 430, the SDFS 142 computes hash(A.dat).

At step 435, determine the method used for storing metadata. If the method is to store the metadata in the HDFS® 141, then the method 400 proceeds to step 440. If the method is to store the metadata as ObjectStore parameters, then the method 400 proceeds to step 455. If the method is to store the metadata appended to the data file, then the method 400 proceeds to step 460.

At step 440, the MR application 120 computes hash(hash (A.dat).metadata).

At step 445, the SDFS 142 requests the creation of file hash(hash(A.dat).metadata).

Step 450 indicates/represents a successful completion of the method.

At step 455, the SDFS 142 writes the metadata for hash(A.dat) to the swift object store 211.

At step 460, the SDFS 142 appends the metadata to the data file(s).

Step 499 indicates/represents a failure of the method.

The present principles solve the aforementioned drawbacks of prior solutions including, but not limited to, (1) providing security for data-at-rest in the cloud that does not prevent/impede analytics processing by an Analytics-as-a-Service solution in the Cloud; (2) allowing for fine-grain control of which files are secured and which are not secured; (3) allowing for fine-grain control of the choice of security parameters and schemes on a per-file basis; and (4) being an application-layer solution that seamlessly integrates with existing Hadoop® (no re-compilation of Hadoop® is needed), without requiring any modifications onto the underlying operating system.

A brief description will now be given of some of the many additional advantages provided by the present principles. One advantage is that the enterprise maintains confidentiality and control of its data. Another advantage is that enterprise data is not accessible by system administrators of the public cloud service provider. Yet another advantage is that the present principles do not change the Hadoop® (MapReduce) code for analytics. Still another advantage is that the present principles do not modify the operating system of the Hadoop® compute nodes in the cluster. A further advantage is that the present principles provide high-availability without compromising security at minimum possible storage cost. An additional advantage is that the present principles maintain the ability to store and analyze in Hadoop® plaintext data. These and other advantages of the present principles are readily determined by one of ordinary skill in the art given the teachings of the present principles provided herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
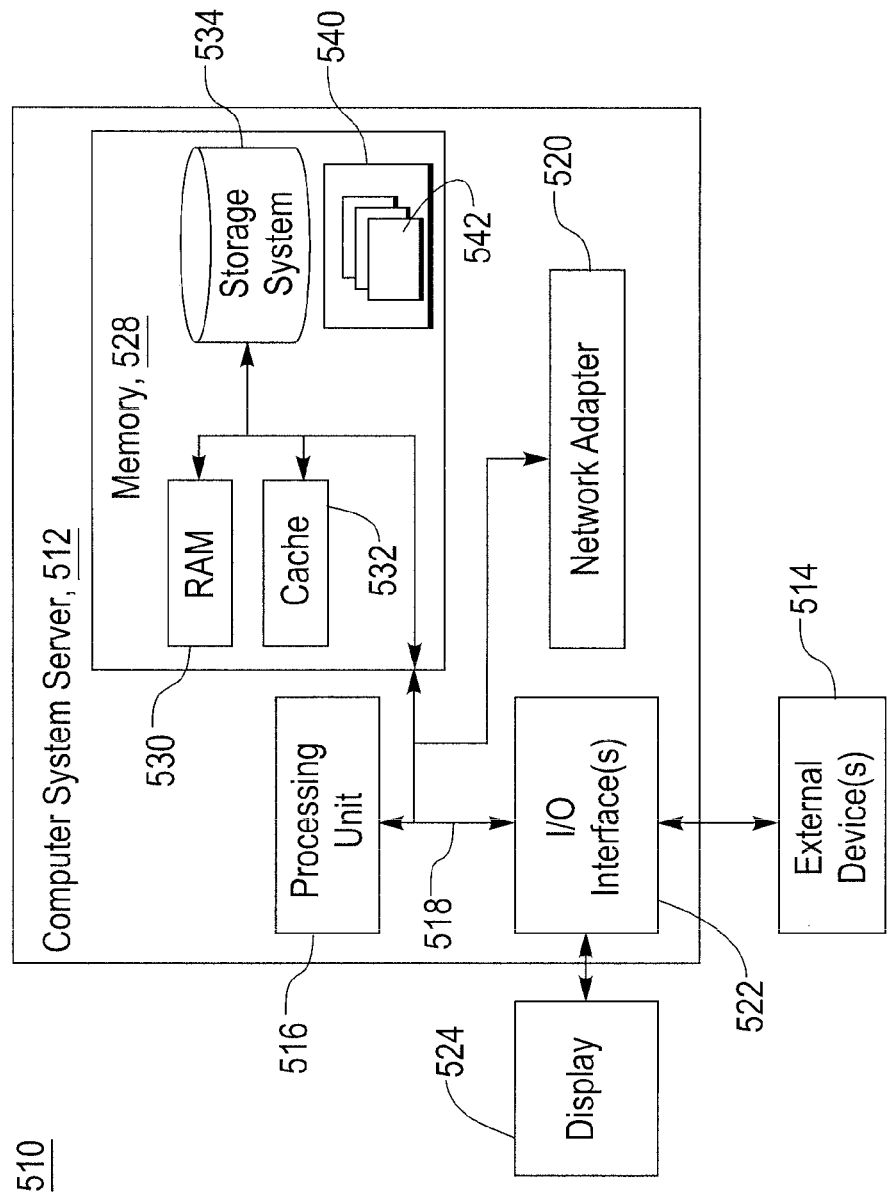
FIG. 5 shows an exemplary cloud computing node 510, in accordance with an embodiment of the present principles.

Referring now to FIG. 5, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
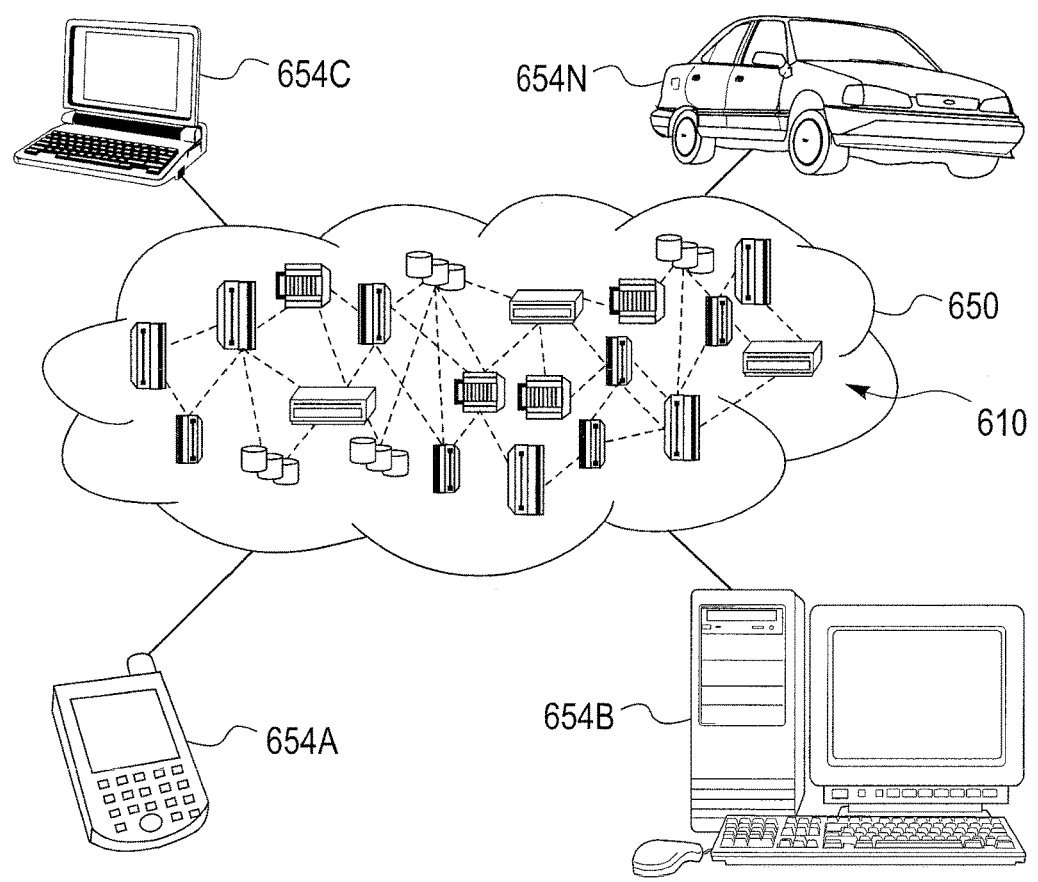
FIG. 6 shows an exemplary cloud computing environment 650, in accordance with an embodiment of the present principles.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
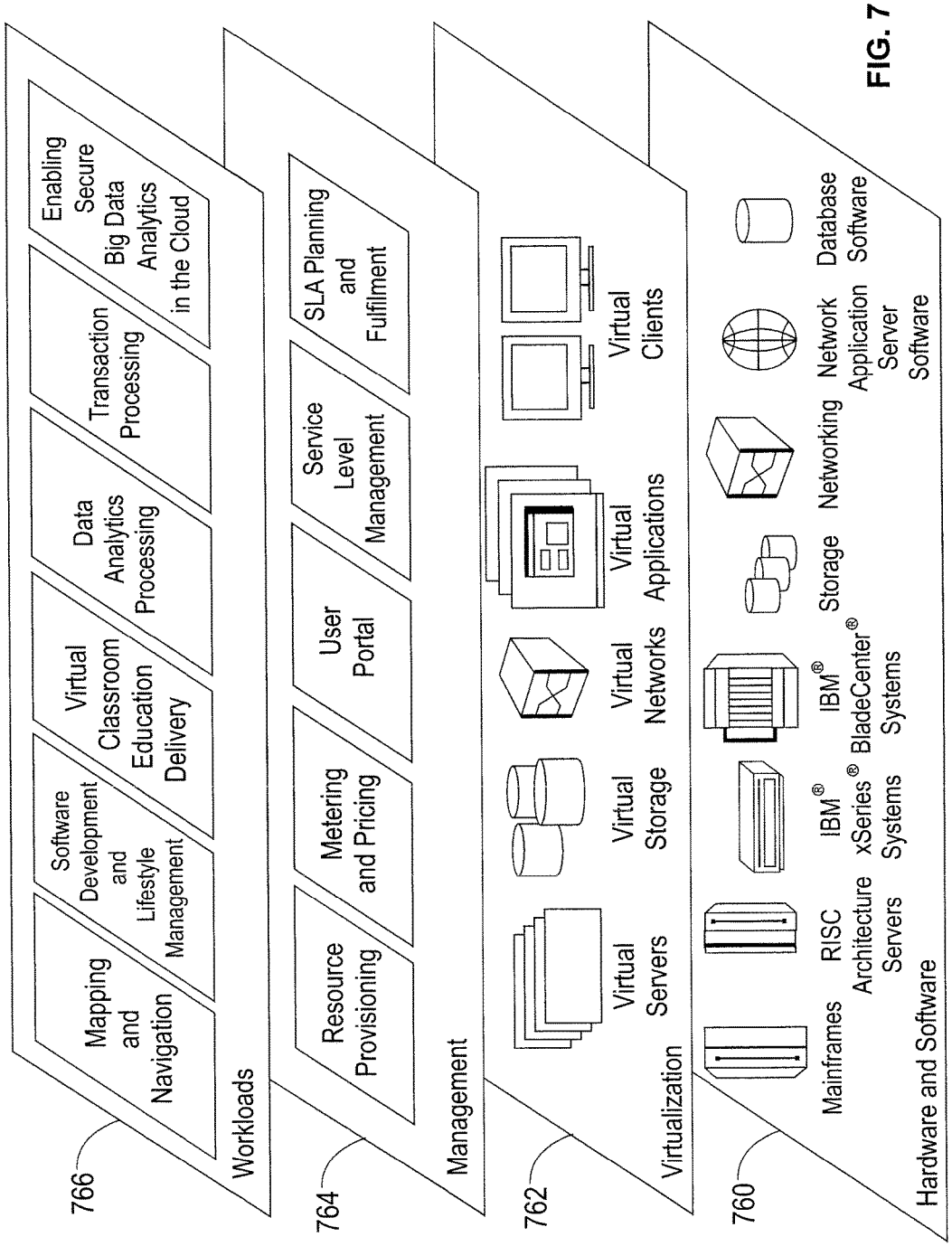
FIG. 7 shows exemplary abstraction model layers, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and enabling secure Big Data analytics in the cloud.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    reading a secure file, by a Secure Distributed File System in a public cloud service provider having a processor and a memory device, wherein said reading step comprises:
        computing a hash of a name of the secure file to obtain a hashed file name;
        finding metadata for the secure file using the hashed file name, the metadata including a sharing policy identifier configured for obtaining a security key;
        retrieving the sharing policy identifier from the metadata;
        obtaining authorization from an external entity to decrypt the secure file;
        extracting the security key and encrypted data file names from the metadata using the sharing policy identifier;
        requesting one or more encrypted data files that form the secure file from a node of the public cloud service provider; and
        decrypting, by the Secure Distributed File System in the public cloud service provider, the secure file from the one or more encrypted data files.

2. The method of claim 1, wherein each of the one or more encrypted data files comprise a metadata portion and one or more data files, the one or more data files including encrypted data.

3. The method of claim 2, wherein the metadata portion comprises a plain text metadata portion that includes a share-policy-name, and an encrypted metadata portion that describes an encryption method used to encrypt the encrypted data and a listing of names of the one or more data files including the encrypted data.

4. The method of claim 2, wherein the metadata portion is stored as any of (a) a separate file, (b) as parameters of a key-value pair that are stored in a key-value store and that correspond to the one or more data files including the encrypted data, and (c) appended at an end of the one or more data files including the encrypted data.

5. The method of claim 2, wherein the metadata portion is stored as the separate file in another distributed file system included in the public cloud service provider.

6. The method of claim 1, wherein said reading step is performed responsive to a request for the secure file by a MapReduce job.

7. The method of claim 1, wherein the external entity is a key caching server.

8. The method of claim 1, wherein the secure file is synchronized with an enterprise storage system.

9. A non-transitory article of manufacture tangibly embodying a computer readable program which when executed causes a computer to perform the steps of claim 1.

10. A method, comprising:
    creating, by a MapReduce application, a secure file configured for storage in a Secure Distributed File System in a public cloud service provider having a processor and a memory device, wherein said creating step comprises:
        determining a sharing policy identifier for the secure file, the sharing policy identifier being configured for obtaining a security key;
        obtaining the security key and security parameters for the secure file from an external entity;
        writing one or more encrypted data files for the secure file;
        computing a hash of a name of the secure file;
        determining a method for storing metadata for the secure file, the metadata including the sharing policy identifier; and
        storing the encrypted data files and the metadata for the secure file, the encrypted data files being configured for decryption by the Secure Distributed File System in the public cloud service provider.

11. The method of claim 10, wherein each of the one or more encrypted data files comprise a metadata portion and one or more data files, the one or more data files including encrypted data.

12. The method of claim 11, wherein the metadata portion comprises a plain text metadata portion that includes a share-policy-name, and an encrypted metadata portion that describes an encryption method used to encrypt the encrypted data and a listing of names of the one or more data files including the encrypted data.

13. The method of claim 11, wherein the metadata portion is stored as any of (a) a separate file, (b) as parameters of a key-value pair that are stored in a key-value store and that correspond to the one or more data files including the encrypted data, and (c) appended at an end of the one or more data files including the encrypted data.

14. The method of claim 10, wherein the secure file is synchronized with an enterprise storage system.

15. A non-transitory article of manufacture tangibly embodying a computer readable program which when executed causes a computer to perform the steps of claim 10.

16. A method, comprising:
    determining, by a Secure Distributed File System in a public cloud service provider having a processor and a memory device, a security key for a file with an obfuscated file name, wherein said determining step comprises:
        determining a storage method used to storing metadata for the file with the obfuscated file name, the metadata including a sharing policy identifier configured for obtaining a security key;

obtaining the metadata responsive to the storage method;

extracting the sharing policy identifier from the metadata;

forwarding the sharing policy identifier to an external entity to request a security key for the file with the obfuscated file name; and receiving the security key from the external entity for one or more encrypted data files, the encrypted data files being configured for decryption by the Secure Distributed File System in the public cloud service provider.

17. The method of claim 16, wherein the storage method comprises storing the metadata as any of (a) a separate file, (b) as parameters of a key-value pair that are stored in a key-value store and that correspond to the one or more data files including the encrypted data, and (c) appended at an end of one or more data files that form the file with the obfuscated file name, the one or more data files including encrypted data.

18. The method of claim 16, wherein the separate file is stored in another Distributed File System included in the public cloud service provider.

19. The method of claim 16, wherein the file is synchronized with an enterprise storage system.

20. A non-transitory article of manufacture tangibly embodying a computer readable program which when executed causes a computer to perform the steps of claim 16.

* * * * *